April 28, 1931. R. H. SMITH 1,802,788
COMBINED OPEN AND SOLID DIE HEADER
Filed June 28, 1928 4 Sheets-Sheet 3
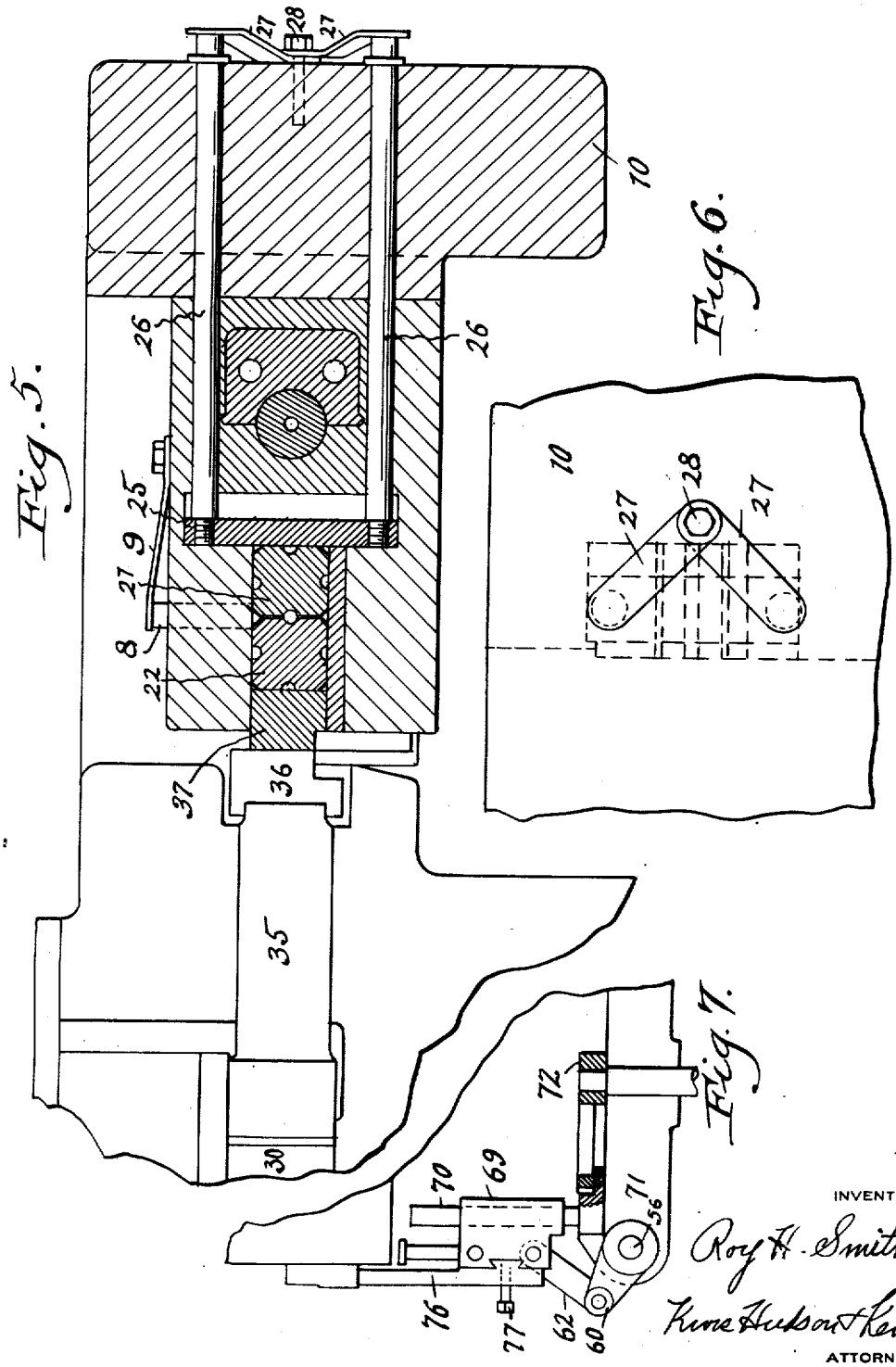

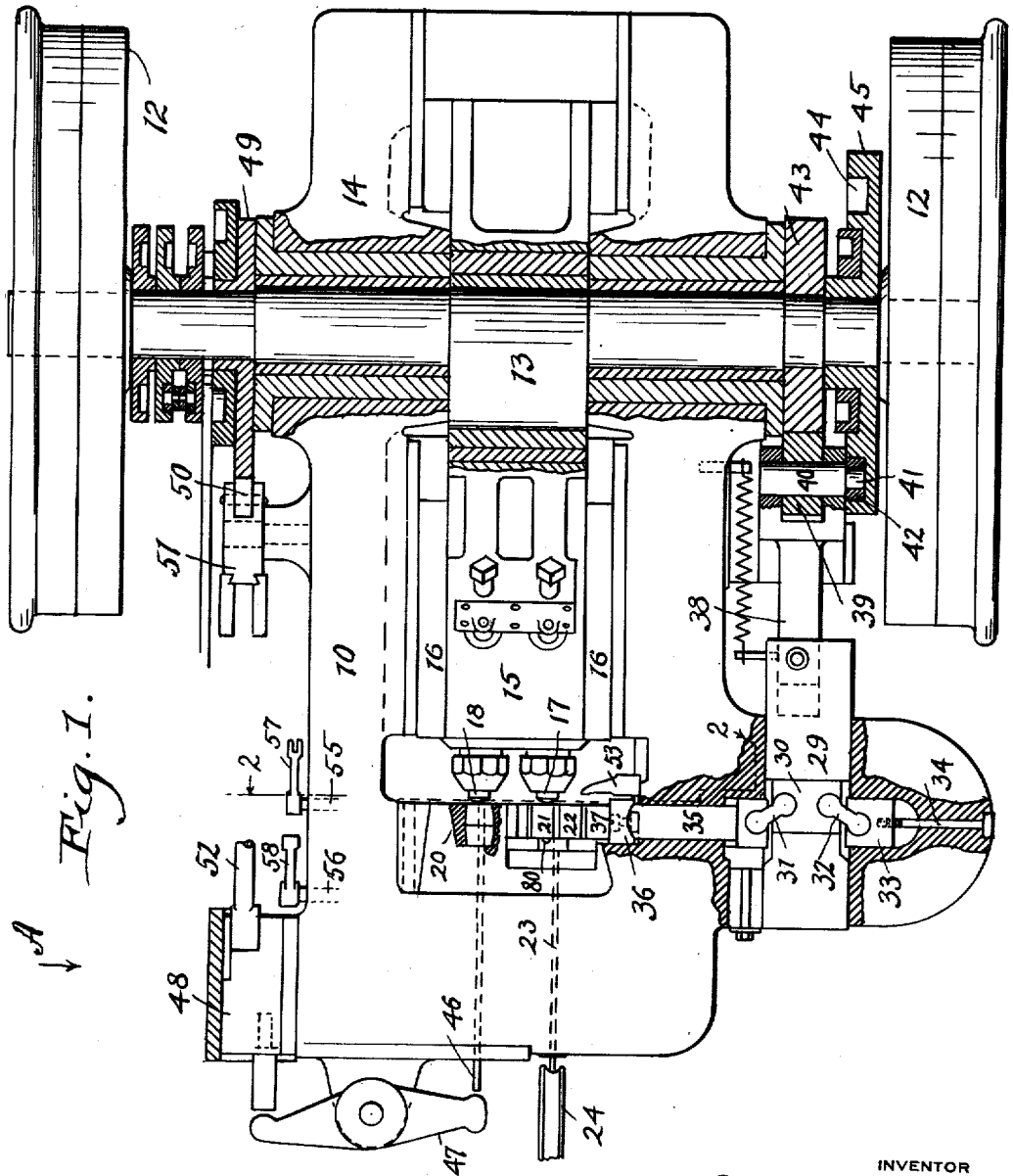

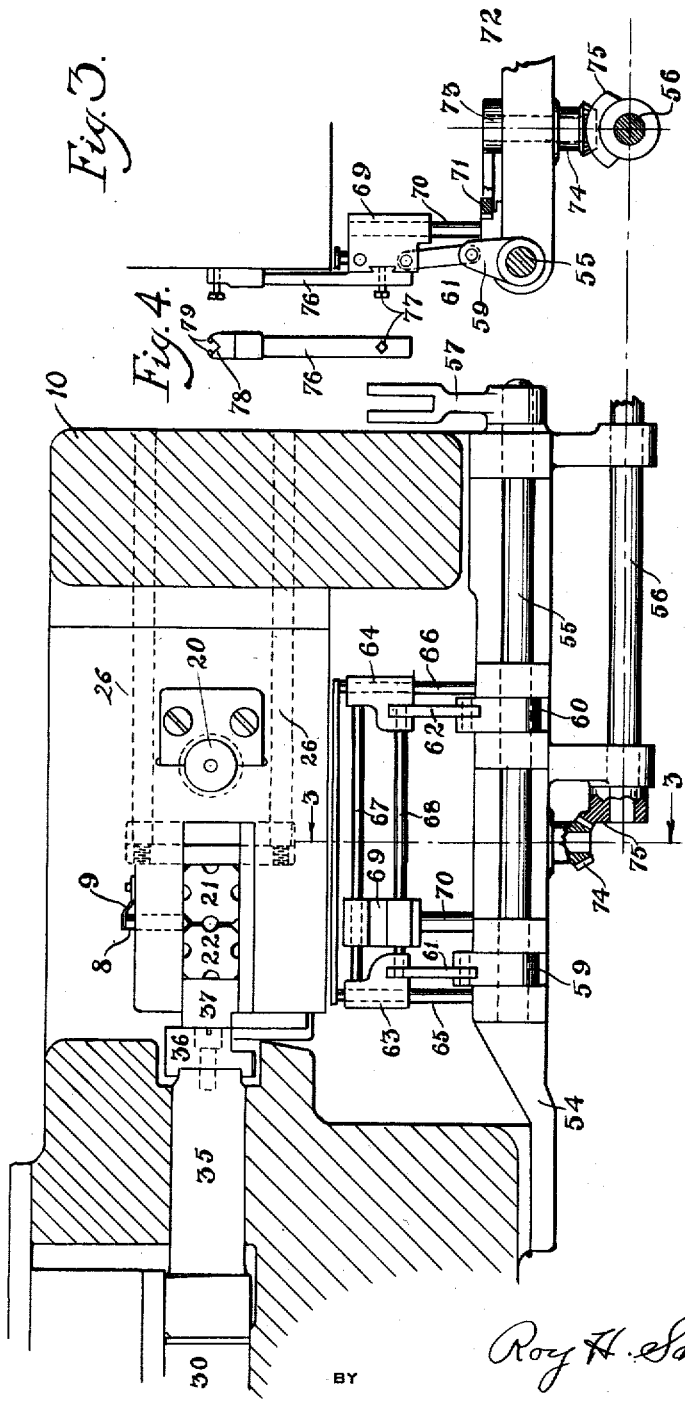

April 28, 1931. R. H. SMITH 1,802,788
COMBINED OPEN AND SOLID DIE HEADER
Filed June 28, 1928 4 Sheets-Sheet 4

INVENTOR
Roy H. Smith
Knox Hudson & Kent
ATTORNEYS

Patented Apr. 28, 1931

1,802,788

UNITED STATES PATENT OFFICE

ROY H. SMITH, OF KENT, OHIO

COMBINED OPEN AND SOLID DIE HEADER

Application filed June 28, 1928. Serial No. 288,941.

This invention relates to a combined open die and solid die header, that is a header in which dies of both types are employed and the advantages of each type are obtained.

The invention is intended primarily for use in the manufacture of bolt, screw and rivet blanks or the like, but obviously is capable of more or less general application.

In open die machines the spreading or opening of the dies, by means of a simple spring arrangement, together with the simultaneous advance of the wire or other material, causes the blank to be ejected, whereas a separate mechanism for ejecting the blank must be employed in a solid die machine.

In an open die machine also the material may be cut by shifting the die transversely over the face of the block through which the material is fed, whereas a separate mechanism for cutting and transferring material to the die must be employed in a solid die machine. On the other hand, solid dies produce a high class of work as to accuracy and finish, whereas open dies, particularly after becoming worn, are apt to leave fins upon the work.

One object of the invention, therefore, is the provision of a machine in which the first blow is struck upon the material when it is in an open die, thereby taking advantage of the economical features of that form of die, and in which the second blow is struck when the blank is in a solid die, whereby accuracy and fine finish are imparted to the product.

Double blow headers are in use, such headers employing a single die but having two hammers which are shifted to strike alternately. In fact, more than two hammers are sometimes employed to strike one after the other. The single blow machine is usually more productive than a multiple blow machine, but the multiple blow header possesses the advantage of being able to gather or upset considerably more material. Its mechanism, however, is necessarily cumbersome and complicated, as the successive hammers or forming tools must be brought into the proper position before the blows are struck.

An object of the present invention is the provision of a machine in which are obtained the advantages resulting from the use of a multiple blow machine without the complication and limited production incident to such machines.

Other objects and features of novelty will appear as I proceed with the description of that embodiment of the invention which, for the purposes of the present application, I have illustrated in the accompanying drawings, in which, Figure 1 is a plan view partially in section of a machine embodying my invention.

Figure 2 is a transverse sectional view taken substantially on the line 2—2 of Figure 1.

Figure 3 is a view partially in vertical section on the line 3—3 of Figure 2.

Figure 4 is a face view of the transfer finger.

Figure 5 is a transverse sectional view on a larger scale of a fragment of the machine illustrating the open and solid dies in position, and the spring actuated pad which works against one side of the open die.

Figure 6 is an end view of the spring for the pad.

Figure 7 is a view similar to Figure 5, illustrating the transfer finger in its lowered position.

Similar reference characters refer to like parts throughout the views.

Figure 8:
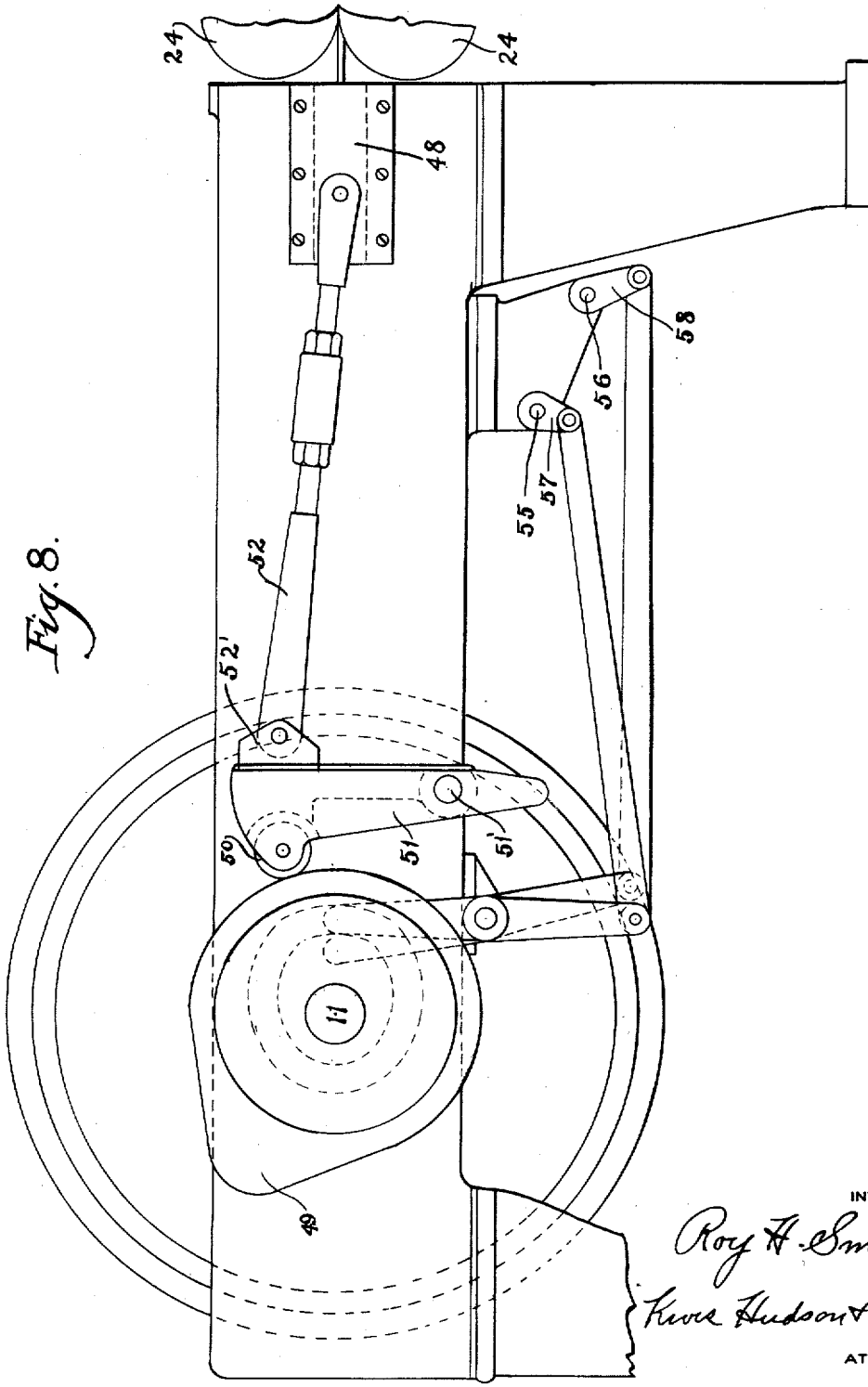
Figure 8 is a side view of the machine, looking in the direction of arrow A, Fig. 1.

In the drawings the bed of the machine is illustrated at 10. In it is mounted for rotation a shaft 11, carrying heavy fly wheels 12, one of which may be employed as a power pulley. Near the center of the shaft 11 there is an eccentric 13 which works in a Scotch yoke construction 14 to reciprocate a hammer carrier 15 that moves in horizontal guides 16. In the forward end of the carrier 15 there are mounted side by side two hammers 17 and 18 which, preferably, are in the same horizontal plane, and the working surfaces of which are preferably in the same vertical plane.

The hammer 18 cooperates with a solid die 20 that is fixedly mounted in the bed of the machine in alignment with the hammer. An open die composed of two pieces 21 and 22 is mounted for limited transverse sliding movement in horizontal guides in the machine bed. When at the limit of its motion toward the right, as viewed in Figs. 2 and 5, the open guide is in alignment with hammer 17. In the drawings it is shown at the limit of its motion toward the left, where its die opening is in alignment with a feed passage 23 in the machine bed. At such times the die pieces 21 and 22 are spaced apart slightly by a pin 8 with a beveled lower end which engages adjacent beveled edges upon the die pieces, resilient means, such as a leaf spring 9, being employed for pressing the pin inwardly.

The wire material from which the blanks are formed is directed into the machine through the passage 23 in any well known manner, such as by means of a pair of superposed feed rolls, illustrated at 24. This open die is normally urged toward the left, as viewed in Figure 5, by a pad 25 mounted on the inner ends of a pair of rods 26, slidable in bored passages in the machine bed. The rods 26 are urged inwardly by a pair of leaf springs 27, that are secured to the machine bed by a bolt 28.

Suitable means are employed for shifting the open die periodically from the illustrated position to a position in alignment with hammer 17. The means herein shown for this purpose comprises a slide 29, in which is formed a transverse guide-way carrying a small slide block 30 having sockets in which a pair of ball ended toggles 31, 32 are mounted. The toggle 32 is also mounted in a socket in a block 33, the position of which may be adjusted by means of a threaded rod 34. The outer end of toggle 32 is, therefore, fixed. Toggle 31, however, is mounted in a socket in a plunger 35 that is slidable in the machine bed and carries at its inner end a die press block 36. Between the block 36 and the die piece 22 there is a filler block 37. Obviously, when the block 29 moves to the left, as viewed in Figure 1, the toggles 31, 32 spread, moving block 30 and toggle 31 inwardly, thereby causing plunger 35, pressure block 36 and filler 37 to move inwardly also. The block 29 is moved by suitable means in predetermined timed relation to other moving parts of the machine, this means including preferably a rod 38, pinned to the block 29 and bifurcated at its opposite end for the reception of a roller 39 that has an axle 40 mounted in the bifurcations of the rod 38 and extending therebeyond at 41, where it is mounted in a cam follower 42. The roller 39 runs upon the periphery of the cam 43, which is fixed to shaft 11, while the follower 42 runs in a cam groove 44 cut into a disc 45 also fixed to shaft 11. A coil spring 9 attached to the block 29 and to the bed of the machine assists cam 44 in retracting the block 29.

In connection with the solid die 20 I employ a knock out of known construction, consisting of a rod 46 slidable in a bore in the bed of the machine and shifted inwardly at timed intervals by means of a knock-out lever 47 which is actuated by a slide 48 that is reciprocated by means of a cam 49 on the shaft 11 through a cam follower 50 that is mounted in one end of a lever 51, pivoted at 51' to the bed of the machine. A connecting rod 52 joins the slide 48 with the lever 51 through the intermediacy of a bracket 52', which is adjustably secured to the lever 51. The length of stroke of the connecting rod 52 may, therefore, be regulated to suit the work being done. 53 is a feed stop which is operated to swing into position at regular intervals to stop the movement of the wire into the machine through the open die, prior to the cut off movement of the die, in other words, when the die is in the position illustrated in the drawings. The feed stop 53 is shown, however, in its inoperative position.

Referring now to Figures 2, 3, 4 and 7 wherein is illustrated the mechanism I employ for transferring blanks from the open die to the solid die, 54 is a bracket that is secured to the underside of the machine bed 10, in which is carried two rock shafts 55 and 56 that are supplied with crank arms 57 and 58, respectively, by means of which oscillating motion is imparted to the shafts in properly timed relation by any suitable mechanism. A pair of arms 59, 60 are secured to the shaft 55 and are pivotally connected to links 61, 62, that are in turn pivoted to slide brackets 63, 64, which are mounted to slide upon vertically arranged posts 65, 66 fixed in the bracket 54. The slide brackets 63, 64 carry a pair of track rails 67, 68. A saddle 69 is mounted to slide upon the rails 67, 68 and also upon a standard 70 that is mounted in and movable with a horizontally sliding rack 71. The rack 71 is adapted to be reciprocated by a pinion 72, which meshes with the rack. A shaft 73, upon which the pinion 72 is fixed, carries a bevel gear 74 at its lower end, which meshes with a toothed sector 75 mounted on the shaft 56. The face of the saddle 69 is provided with a dovetail slot, as shown, for the reception of a dovetail projection upon the rear side of a vertically extending transfer finger 76. The position of the latter in the slot of the saddle may be adjusted and the finger held in such position by means of a screw 77. At its upper end the finger 76 is provided with a V-slot 78 to receive the blank, and with a pair of spring retaining catches 79 of known construction. For the sake of clearness the finger 76 is omitted from Figure 2.

Operation

Wire or other material enters the machine from a coil generally through the bored passage 23 and the opening formed by registering grooves in the meeting faces of the die pieces 21, 22. This occurs when the open die is in the position illustrated in Figure 1, when the feed stop is swung from the inoperative position there illustrated to a position directly in front of the die. The feed of the wire being thus stopped the slide 29 moves toward the left (Fig. 1), which causes the plungers 35 to shift the open die away from the position illustrated, thereby cutting off a section of material, and transferring the same to a position directly in front of hammer 17. The hammer 17 is at that time retracted. When it strikes, the blank is headed, and its end is beveled in a depression 80 behind the die. The block 29 then moves toward the right and the springs 27 act to shift the die pieces 21, 22 transversely to again center them with the bore 23. At the same time the pressure of one die piece upon the other is relieved, owing to the fact that the pad 25 has a limited movement and does not follow the retraction of the plunger 35 quite completely. The wire feed then resumes operation. A new section of wire enters the open die and forces out the partially formed blank.

Just at this time the finger 76 rises on account of the rocking of shaft 55, which causes the rails 67, 68 to rise, thereby sliding saddle 68 upwardly upon the standard 70. When the spring retaining catches 79 strike the blank they recede, permitting the blank to enter the V-slot 78, and then immediately spring back into position to hold the blank in the finger. Thereupon shaft 56 rocks in a counter-clockwise direction, as viewed in Figure 3, turning bevel gear 74 and pinion 72 and shifting the rack 71 toward the right, as viewed in Figure 2, until the finger stands directly in front of closed die 20. The die carrier 15 in the meantime is moved backwardly and is now moving forwardly. As soon as the latter movement has progressed far enough to cause the hammer 18 to strike, and to begin the movement of the blank into the solid die 20, the finger 76 starts to drop from the position of Figure 3 to that of Figure 7, this movement being brought about by a counter-clockwise partial rotation of the shaft 55. The finger 76 is thereby withdrawn from the line of movement of the hammer 18. The shaft 56 then rotates in a counter-clockwise direction, shifting rack 71 to the left, and carrying finger 76 to a position directly beneath the line of action of the hammer 17. After the latter hammer has struck the next succeeding blank, shaft 55 turns clock-wise so as to raise track rails 67, 68 and move the finger 76 upward in time to grip the blank, whereupon another cycle of movements of the finger mechanism begins. When the rack 71 moves, the standard 70, of course, moves with it and carries along the saddle 69, the latter sliding upon the track rails 67, 68. When the rails move up and down the saddle 69, of course, moves with them, this being permitted by the sliding connection between the saddle and the standard 70.

The knock-out mechanism employed in connection with the solid die 20 functions in the ordinary and usual manner of such mechanisms, the rod 46 being moved inwardly at the proper time to enter the die and engage the rear end of the blank, forcing it out of the die into any suitable chute or container.

While in the attached drawings and foregoing description I have disclosed more or less in detail one particular embodiment of my invention, it is obvious that variations and modifications may be made without departing from the spirit of the invention. Accordingly I desire it to be understood that the disclosure herein is not to be construed as limiting the scope of the invention.

Having thus described my invention what I claim is:

1. In a header, an open die and a solid die adapted to perform successive operations upon the same blank, a pair of hammers co-operating with said dies respectively, means for feeding material into said open die, means for moving said open die transversely to cut the material into blank lengths and to position the open die with its material in front of the first blow hammer, and means for transferring each blank from the open die to the solid die after being struck in the open die.

2. In a header, an open die and a solid die adapted to perform successive operations upon the same blank, a pair of hammers co-operating with said dies respectively, means for feeding material into said open die, means for moving said open die transversely to cut the material into blank lengths and to position the open die with its material in front of the first blow hammer means operating after a blow struck upon said open die for feeding a new length of material into said open die, thereby ejecting the first blank, means for transferring said ejected blank to the solid die, and means for ejecting a blank from the solid die.

3. In a header, an open die and a solid die adapted to perform successive operations upon the same blank, a pair of hammers driven to strike said dies simultaneously, and means operating between successive hammer blows for feeding material into the open die from the rear and thereby ejecting the blank in said open die, for transferring said blank to the solid die, and for ejecting the finished blank from the solid die.

In testimony whereof, I hereunto affix my signature.

ROY H. SMITH.

upon the same blank, a pair of hammers driven to strike said dies simultaneously, and means operating between successive hammer blows for feeding material into the open die from the rear and thereby ejecting the blank in said open die, for transferring said blank to the solid die, and for ejecting the finished blank from the solid die.

In testimony whereof, I hereunto affix my signature.

ROY H. SMITH.

CERTIFICATE OF CORRECTION.

Patent No. 1,802,788.    Granted April 28, 1931, to

ROY H. SMITH.

It is hereby certified that error appears in the printed specification of the above numbered patent requiring correction as follows: Page 3, line 114, claim 2, after the word "solid" insert the word die; and that the said Letters Patent should be read with this correction therein that the same may conform to the record of the case in the Patent Office.

Signed and sealed this 26th day of May, A. D. 1931.

M. J. Moore,
Acting Commissioner of Patents.

(Seal)

CERTIFICATE OF CORRECTION.

Patent No. 1,802,788.                         Granted April 28, 1931, to

ROY H. SMITH.

It is hereby certified that error appears in the printed specification of the above numbered patent requiring correction as follows: Page 3, line 114, claim 2, after the word "solid" insert the word die; and that the said Letters Patent should be read with this correction therein that the same may conform to the record of the case in the Patent Office.

Signed and sealed this 26th day of May, A. D. 1931.

(Seal)                                                 M. J. Moore,
                                                         Acting Commissioner of Patents.